(No Model.) 2 Sheets—Sheet 1.
R. S. PEASE.
APPARATUS FOR CONTROLLING TEMPERATURE.
No. 604,077. Patented May 17, 1898.
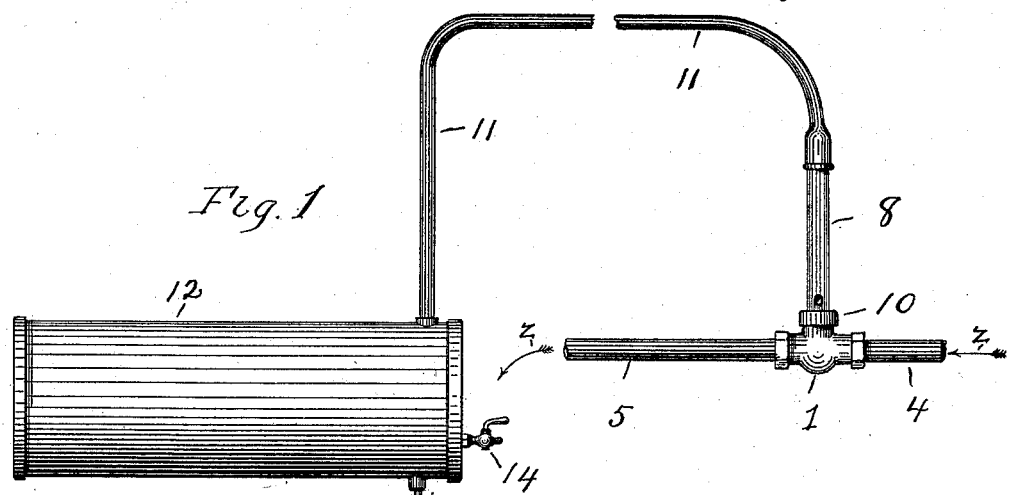
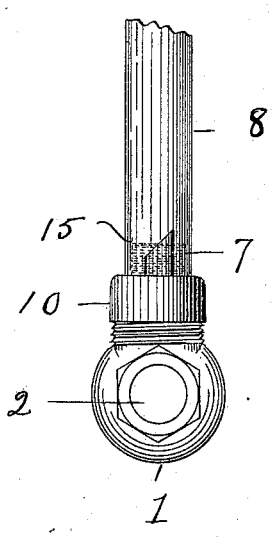
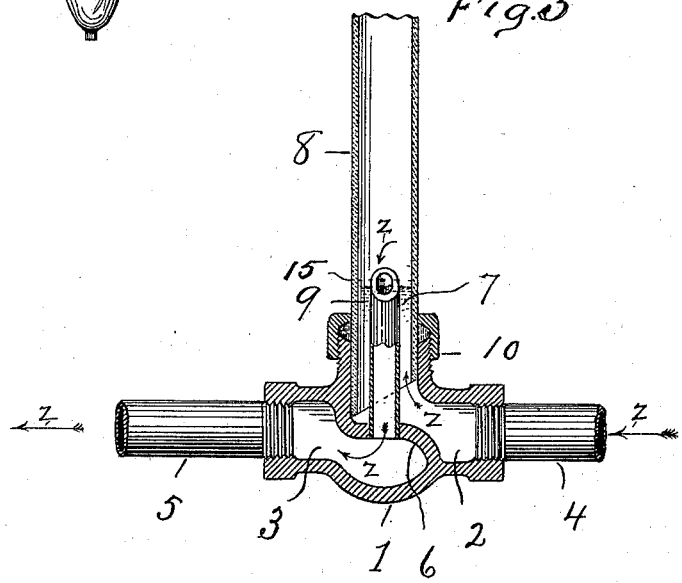
Witnesses.
R. Blum
Carrie Patchin
Inventor.
Roger S. Pease
By his Attorney.
P. H. Gemekel (No Model.) 2 Sheets—Sheet 2.
R. S. PEASE.
APPARATUS FOR CONTROLLING TEMPERATURE.
No. 604,077. Patented May 17, 1898.
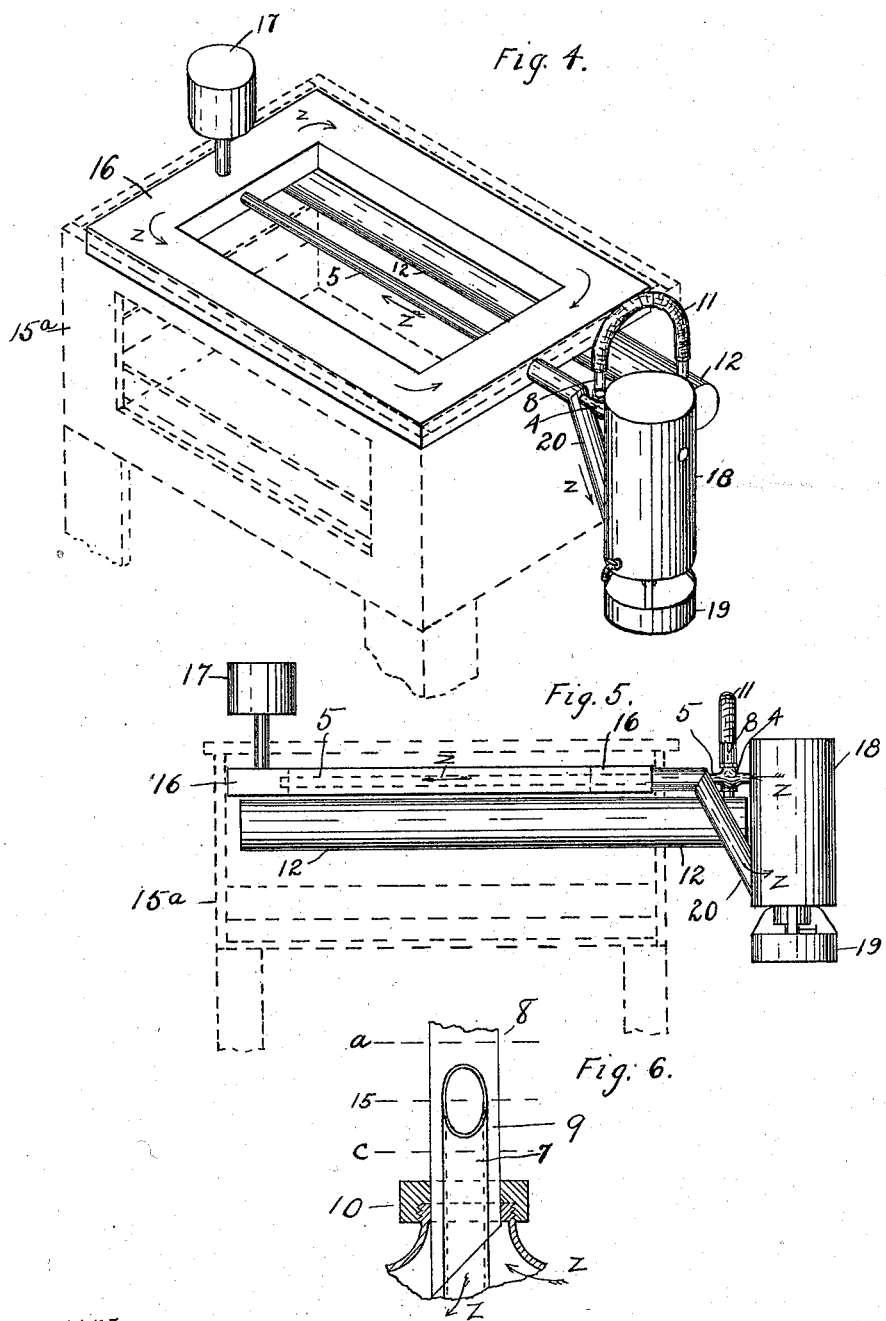
Witnesses.
E. E. Phoenix
C. E. Knight
Inventor.
Roger S. Pease
By P. H. Gunckel
His Attorney.

UNITED STATES PATENT OFFICE.

ROGER S. PEASE, OF ROSE, MINNESOTA, ASSIGNOR, BY MESNE ASSIGNMENTS, OF ONE-HALF TO JULIUS U. MINER, OF MINNEAPOLIS, MINNESOTA.

APPARATUS FOR CONTROLLING TEMPERATURE.

SPECIFICATION forming part of Letters Patent No. 604,077, dated May 17, 1898.

Application filed August 11, 1897. Serial No. 647,775. (No model.)

*To all whom it may concern:*

Be it known that I, ROGER S. PEASE, a citizen of the United States, residing in the town of Rose, county of Ramsey, and State of Minnesota, have invented certain new and useful Improvements in Apparatus for Controlling Temperature, of which the following is a specification.

My invention relates to temperature-controlling apparatus in which automatic devices controlled by the temperature of the place to be warmed are employed for regulating the flow of the heating liquid.

The object of the invention is to produce a simple and reliable apparatus intended, primarily, for maintaining even temperatures in incubators, greenhouses, &c., but which may be modified in structure to adapt it for use in warming dwellings or other buildings.

The improvements, generally stated, consist of devices adapted to automatically regulate the flow of liquid in a heating system by the pressure of a confined fluid upon a column of the liquid in the circuit, the pressure of the fluid being controlled by the temperature of the place of supply of the fluid.

In illustrating a practical application of the invention the accompanying drawings show forms of devices specially adapted for use in incubators, and these, it is thought, will sufficiently indicate the mode of operation and manner of employing the devices to enable persons skilled in the art to utilize the invention for other purposes by varying the forms while utilizing the substance of what is shown.

Figure 1 of the accompanying drawings shows in elevation the principal operative portions of the devices of the invention; Figs. 2 and 3, details of the valve devices used therein; Fig. 4, a perspective view of the complete system of the devices as employed in an incubator; Fig. 5, a central vertical section of the same; and Fig. 6, an enlarged detail view of the valve device, indicating different levels of the column of the heating liquid.

In such drawings, 1 indicates an ordinary valve-shell providing an inlet-port 2 and an outlet-port 3. Connected to the inlet there is shown a pipe 4 for introducing the liquid and connected to the outlet a pipe 5 for discharging the liquid. The pipe-sections shown in Figs. 1 and 3 are portions of the pipes similarly marked in Figs. 4 and 5, used in an incubator; but they may be assumed to be portions of pipes for heating by means of the circulation of hot water or other liquid used in the well-known way for heating purposes in buildings or elsewhere. In the port of the partition 6 of the valve-shell, whereon a valve is usually seated, there is in this instance fastened a tube 7, which is in communication with the discharge-opening 3 and extends vertically through a lateral opening at the top of the valve-shell as far upward as desired. Surrounding and concentric with this tube 7 is a larger tube 8, and an intermediate annular space 9 is thus provided to receive the liquid from the inlet 2. The tube 8 (preferably of glass in order that the flow of the liquid may be observed) may be connected in any convenient way to the valve-shell, as by means of the stuffing-box 10. By this arrangement, as will be obvious, liquid may be made to flow inward through the pipe 4 and chamber 2, upward into the chamber 9, and thence downward through the tube 7 to the chamber 3 and onward through the pipe 5. The course of the flow of the liquid is indicated by the arrows z in the drawings.

In order to control and regulate the flow of liquid through the pipes 4 and 5, the tube 8 is extended or connected by a suitable pipe 11 to a tank 12, containing air or other fluid. The fluid in the tank or chamber 12 may be compressed or partially exhausted by means of an elastic bulb 13, connected therewith and provided with suitable valves, and the degree of the compression or exhaustion of the fluid may be regulated by a cock 14, provided in any part of the tank 12 or on the connection between the pumping device and air-chamber. While the compression or exhaustion of air in the chamber is not essential to render the apparatus operative, it affords a convenient way for varying the pressure of the fluid upon the liquid at the valve device as may be desired, and thus enables the operator to control and fix the degree of pressure exerted by the fluid at any given temperature and thereby to adjust the apparatus to maintain the desired temperature in the chamber to be warmed. Any usual or suitable device may be employed for storing or compressing or partially exhausting the fluid in a chamber and supplying it to the valve devices, and so what is illustrated in the drawings is shown only for the purpose of indicating one way in which the invention may be applied and not for the purpose of limiting the invention to the specific means set forth.

In use, the parts being arranged and connected as suggested or in any analogous way and a liquid heated by a boiler or in any well-known way for circulation through the system, the air in the tank 12 may be heated or compressed or partially exhausted until a point is reached where a column of water in the tube 8 is equalized by the opposing air-pressure at the desired level, which, for illustration, may be as indicated by the line 15, and this would permit a continuous moderate or half flow of the liquid. If then the temperature of the tank 12 were lowered, so that the air-pressure on the liquid would be correspondingly diminished, the column of liquid in the tube would rise, say, to the level of the line $a$ and increase the flow through the pipes 4 and 5. Then upon an increase of temperature of the fluid its pressure upon the water would correspondingly increase and the level of the water be lowered, say, from the level indicated by the dotted line $a$ to that of the line $c$ in Fig. 6, the flow at the upper level being full and gradually diminished until entirely cut off when the level is below the aperture of the valve-tube 7. This operation would occur if the variation of temperature of the fluid was wide enough to cause the range of fluctuations suggested; but in the practical operation of the devices these extremes of fluctuation need rarely, if ever, occur. This is because the upper end of the tube 7 is cut diagonally, as indicated in the drawings, in order that when the level of the column of water is lowered the flow through the outlet will decrease gradually by reason of the diminishing area of the opening through which the liquid escapes as its level lowers, and by reason of the gradually-diminishing flow of the heating liquid the temperature of the compression fluid is varied gradually, so that it is practicable to maintain a constant flow between the limits of a full flow and a complete cut-off.

A practical application of the invention has been made in incubators in which the arrangement of devices was substantially as shown in Figs. 4 and 5. In these views the broken lines 15ª indicate an incubator-casing in which is contained a suitable tank 16, extending in circuit within the walls of the casing, and which is provided with an expansion-chamber 17, that may be of any usual or suitable form and arrangement. A liquid-heater 18 is provided adjacent to the incubator, and the heat therefor may be supplied by a lamp 19 or by other means. The liquid from this heater flows through a pipe 4 to the valve device and thence through a pipe 5 to the warming-tank 16, and the return flow is through a pipe 20, connecting the tank 16 and the heater 18. An air-tank 12, of metal or other suitable material and of proper proportions, is placed in the incubator-casing, and a pipe 11 connects it with the tube 8 of the valve devices. The operation of the devices is obvious from what has already been stated. In practice it has been demonstrated that when the devices have been suitably arranged and the pressure adjusted and the supply of water and heat at the heating-tank have been kept up the temperature in the incubator can be maintained indefinitely at practically the desired point, say 103°, without a variation of as much as one degree.

It will be obvious that similar apparatus arranged to operate upon like principles might be readily adapted for other uses, and that liquid other than water might be used in the heating system, and fluids or gases other than air might be used in substantially the same manner for counterbalancing a column of the heating liquid without departing from the principles of the invention herein set forth.

What I claim, and desire to secure by Letters Patent, is—

1. In a circulatory liquid-heating system, a valve-chamber in the circuit, a valve therein having its port arranged to permit the liquid to flow onward through it only when the surface of the liquid in the chamber is above a predetermined level, and a fluid-holder connected with said chamber for producing fluid-pressure upon the liquid therein to vary its level and thereby control its flow through the valve and its circulation in the system, substantially as set forth.

2. In a circulatory liquid-heating system, a valve-chamber in the circuit, a valve therein having its port arranged to receive a full flow when the liquid-level is above the port and to present a gradually-diminishing passage-way as the level lowers toward the point of cut-off, and a fluid-holder connected with said chamber for producing varying pressure upon the liquid therein to change its level and thereby regulate its circulation, substantially as set forth.

3. The combination in a circulatory liquid-heating system, of a fluid-holder arranged to have its temperature affected by the heating system and having connection with a chamber in the liquid-circuit, whereby changes of the fluid-temperature cause corresponding variations of pressure upon the liquid and consequent fluctuations of the liquid-level in the chamber, and a valve in said chamber having a free port within the range of such fluctuations of the liquid-level, whereby the liquid circulation is controlled by the fluid-pressure, substantially as set forth.

4. In a circulatory liquid-heating system, a valve having a port provided in a chamber in the liquid-circuit, and a fluid-pressure device arranged to communicate with said chamber to regulate the level of the liquid therein relative to the valve-port, and means for regulating the pressure of the fluid upon the liquid in said chamber, substantially as set forth.

5. In a circulatory liquid-heating system, the combination with a valve-chamber, and a valve therein having a port arranged to receive a full flow when the liquid is at a given level and a gradually-diminishing flow as the level is lowered, and a temperature-controlled fluid-pressure device in communication with said chamber for changing the level of the liquid therein to regulate its flow through the port, substantially as set forth.

6. The combination in a liquid-heating system, of a circulatory pipe, a valve-fitting therein, said fitting provided with a diaphragm crossing its axis, a fluid-pipe communicating with said fitting on one side of the diaphragm and with a fluid-reservoir, and a pipe extending downward from within the fluid-pipe and communicating with the valve-fitting on the opposite side of said diaphragm, said pipe providing a communication for the liquid from one to the other side of the diaphragm, the flow of the liquid being regulated by the pressure of the fluid in the fluid-reservoir, substantially as set forth.

7. The combination with the pipes of a liquid-heating system, of a valve-shell connecting them, a vertical tube connected with the inlet, a shorter concentric tube communicating with the outlet and providing a port arranged to receive a gradually-diminishing volume as the level of the liquid is lowered from full flow to cut-off, and a fluid-pressure device having connection with said outer tube for producing varying pressure on the liquid in the tubes to regulate its flow, substantially as set forth.

8. In an incubator, the combination with a casing, of a circulatory liquid system and means for heating the liquid, a valve-chamber provided with a valve presenting a gradually-diminishing port as the level of the liquid is lowered from a full flow to the point of cut-off, and a suitable fluid-holder located in the incubator-casing and having communication with the valve-chamber for producing fluid-pressure on the liquid therein to regulate its level and consequently its circulation through said port and incubator, substantially as set forth.

In testimony whereof I have hereunto set my hand this 6th day of March, 1897.

ROGER S. PEASE.

In presence of—
  R. BLUME,
  P. H. GUNCKEL.